US010112606B2

(12) United States Patent
Jain et al.

(10) Patent No.: US 10,112,606 B2
(45) Date of Patent: Oct. 30, 2018

(54) SCALABLE SENSOR FUSION AND AUTONOMOUS X-BY-WIRE CONTROL

(71) Applicant: International Business Machines Corporation, Armonk, NY (US)

(72) Inventors: Rakesh Jain, San Jose, CA (US); Gabor Madl, San Jose, CA (US); Ramani R. Routray, San Jose, CA (US); Yang Song, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 15/004,718

(22) Filed: Jan. 22, 2016

(65) Prior Publication Data

US 2017/0210376 A1   Jul. 27, 2017

(51) Int. Cl.
*B60W 30/00* (2006.01)
*B60T 8/171* (2006.01)
*B60T 8/88* (2006.01)
*H04L 29/08* (2006.01)
*G05D 1/00* (2006.01)
*B60T 7/18* (2006.01)
*G01S 19/13* (2010.01)
(Continued)

(52) U.S. Cl.
CPC ............... *B60W 30/00* (2013.01); *B60T 7/18* (2013.01); *B60T 7/22* (2013.01); *B60T 8/171* (2013.01); *B60T 8/885* (2013.01); *B62D 15/025* (2013.01); *G01S 17/87* (2013.01); *G01S 19/13* (2013.01); *G05D 1/0088* (2013.01); *H04L 67/10* (2013.01); *H04L 67/12* (2013.01); *B60T 2270/402* (2013.01); *B60T 2270/82* (2013.01); *B60W 2420/42* (2013.01); *B60W 2420/52* (2013.01)

(58) Field of Classification Search
None
See application file for complete search history.

(56) References Cited

U.S. PATENT DOCUMENTS 6,151,539 A    11/2000  Bergholz et al.
6,434,698 B1 *  8/2002  Maiolani ............ G06F 11/1417
                                                            713/1
(Continued)

FOREIGN PATENT DOCUMENTS

GB    2345153 A    6/2000

OTHER PUBLICATIONS

Dean, Jeffrey and Sanjay Ghemawat, MapReduce: Simplified Data Processing on Large Clusters, Jan. 2008, Communications of the ACM, p. 107 (Year: 2008).*
(Continued)

*Primary Examiner* — Jelani A Smith
*Assistant Examiner* — Kelly D Williams
(74) *Attorney, Agent, or Firm* — Sherman IP LLP; Kenneth L. Sherman; Steven Laut

(57) ABSTRACT

An autonomous system for x-by-wire control includes processing nodes distributed and connected to one another. Sensors are connected to the processing nodes. Actuators are configured to directly control the autonomous system driven by and connected to the processing nodes for x-by-wire control. The processing nodes are configured to: partition and map processing tasks between the processing nodes, and merge and reduce results of individual processing tasks into an actionable table that specifies objectives for the autonomous system.

20 Claims, 10 Drawing Sheets

(51) Int. Cl.
  *B62D 15/02* (2006.01)
  *B60T 7/22* (2006.01)
  *G01S 17/87* (2006.01)

(56) References Cited

U.S. PATENT DOCUMENTS

| | | | |
|---|---|---|---|
| 6,747,365 B2 | 6/2004 | Reinold et al. | |
| 7,272,496 B2 | 9/2007 | Remboski et al. | |
| 8,166,096 B1* | 4/2012 | Odom | G06F 9/5072 |
| | | | 709/201 |
| 8,179,787 B2 | 5/2012 | Knapp | |
| 9,720,419 B2* | 8/2017 | O'Neill | G05D 1/0276 |
| 2003/0184158 A1 | 10/2003 | Fuehrer | |
| 2003/0195938 A1* | 10/2003 | Howard | G06F 8/45 |
| | | | 709/208 |
| 2004/0099468 A1* | 5/2004 | Chernoff | B60T 7/085 |
| | | | 180/409 |
| 2014/0306814 A1* | 10/2014 | Ricci | H04W 4/21 |
| | | | 340/425.5 |
| 2014/0306833 A1* | 10/2014 | Ricci | B60Q 1/00 |
| | | | 340/901 |
| 2016/0321848 A1* | 11/2016 | Ricci | G07C 9/00158 |

OTHER PUBLICATIONS

Wilwert, C. et al., "Design of automotive X-by-Wire Systems", The Industrial Communication Technology Handbook, Aug. 27, 2007, pp. 1-35, France.

Mell, P., et al., "The NIST Definition of Cloud Computing", National Institute of Standards and Technology Special Publication 800-145, Sep. 2011, pp. 1-7, U.S. Department of Commerce, United States.

* cited by examiner

SCALABLE SENSOR FUSION AND AUTONOMOUS X-BY-WIRE CONTROL

BACKGROUND

Safety-critical systems are increasingly connected, networked, and may rely on advanced computers for control. Fly-by-wire systems were developed within the aerospace industry for the purpose of decoupling control surfaces from direct pilot input, focusing on the intent of the pilot. Similarly, in the automotive industry, Anti-lock Brake Systems (ABS) have evolved into sophisticated Advanced Driving Assistance Systems (ADAS) that help drivers better deal with emergency situations, as well as routine tasks such as a "smart" cruise control.

Recently, there has been interest in autonomous vehicles. A notable example is the Self-driving Car, that is able to navigate through public streets through the use of an advanced Light Detection and Ranging (LIDAR) system coupled with other sensors. Several proposals have propped up suggesting deployment of autonomous drones for the purpose of delivering products to customers, and performing autonomous machine work for the hazard-prone mining environment.

SUMMARY

Embodiments of the invention relate to scalable sensor fusion and autonomous x-by-wire control. In one embodiment, an autonomous system for x-by-wire control includes processing nodes distributed and connected to one another. Sensors are connected to the processing nodes. Actuators are configured to directly control the autonomous system driven by and connected to the processing nodes for x-by-wire control. The processing nodes are configured to: partition and map processing tasks between the processing nodes, and merge and reduce results of individual processing tasks into an actionable table that specifies objectives for the autonomous system.

These and other features, aspects and advantages of the present invention will become understood with reference to the following description, appended claims and accompanying figures.

DETAILED DESCRIPTION

Figure 1:
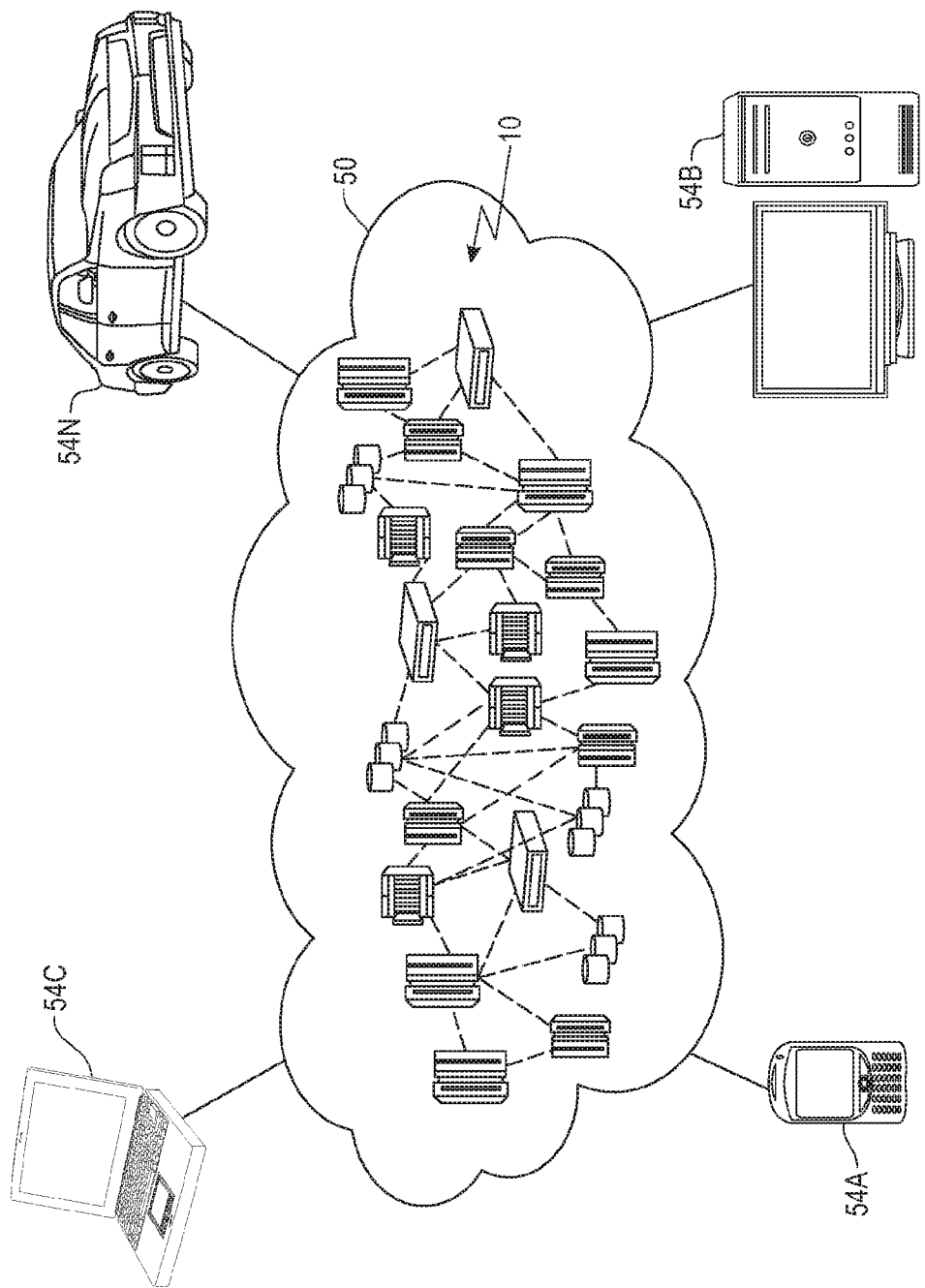
FIG. 1 depicts a cloud computing environment, according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Despite recent advancements, existing systems and methods for sensor fusion and autonomous control are often point solutions and rely on specific sensors/actuators, and may require significant changes if the sensors/actuators change. The conventional systems are often retrofitted on existing vehicles, mimicking the input from humans, and thus unnecessarily restricting the number of control signals to what a human is able to handle. As the number of sensors and actuators grow in advanced autonomous vehicles, this could turn into a serious limitation.

One or more embodiments provide a system and method for sensor fusion, sense and avoid (SAA) and fully autonomous x-by-wire control, without the need for traditional, mechanical means of control such as pedals, levers, sticks, or steering wheels. The term "by-wire" is a general term that typically means effectively replacing a pure mechanical system of motion or control with a sensor and an actuator, and with a computer between the two. In aviation industry, for performance military aircraft to achieve high aerodynamic surface control response, the design of the aircraft is made to be inherently unstable in flight. Without computers on board to control the flight surfaces, the aircraft would be uncontrollable. The computer allows the aircraft to convert instability into responsiveness. So even when the pilot commands the stick, e.g., straight and level, the computers and control surfaces are constantly working to maintain the aircraft straight and level. X-by-wire technology traditionally captures a number of different categories, such as fly-by-wire, drive-by-wire, throttle-by-wire, brake-by-wire, and steer-by-wire.

Autonomous systems are driven by a large number of heterogeneous sensors. One or more embodiments include a virtualization framework to scale up computation power as the number of sensors grow, while also meeting real-time requirements. In one embodiment, the system is reliable and fault-tolerant, so that the safety of the system is not affected by the failure of any single component. One or more embodiments provide horizontal scalability and fault-tolerance by simply adding more processing nodes to the autonomous processing "cloud" environment (e.g., a distributed local node environment for virtualization) through the use of real-time MAP and REDUCE operators. Adding new sensors to an existing autonomous vehicle can increase computation needs exponentially, therefore the scalability of computation power is of primary importance. One or more embodiments provide sensor-agnostic implementation of sensor fusion. Sensor fusion performs processing that is not tied to any particular sensor or actuator, but rather a standard platform for sensor fusion. All sensors and actuators are directly read/controlled by the autonomous processing cloud. In one embodiment, the autonomous processing cloud includes homogeneous processing nodes—rather than a set of heterogeneous and custom-built hardware/software (HW/SW) boxes—and carries out all tasks necessary for the autonomous control. Full x-by-wire control is provided rather than earlier approaches, which focus on activating manual pedals, levers, and turning steering wheels. All mechanical linkages between sensors/actuators and the autonomous cloud can be eliminated, resulting in potentially significant weight savings. One or more embodiments are applicable to a wide range of autonomous systems, not just autonomous vehicles. For example, robotics, smart homes performing surveillance tasks, threat tracking for sense and avoid, etc. One or more embodiments perform processing in the autonomous processing cloud, but may also use a cloud environment for any non-real-time processing or communications.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
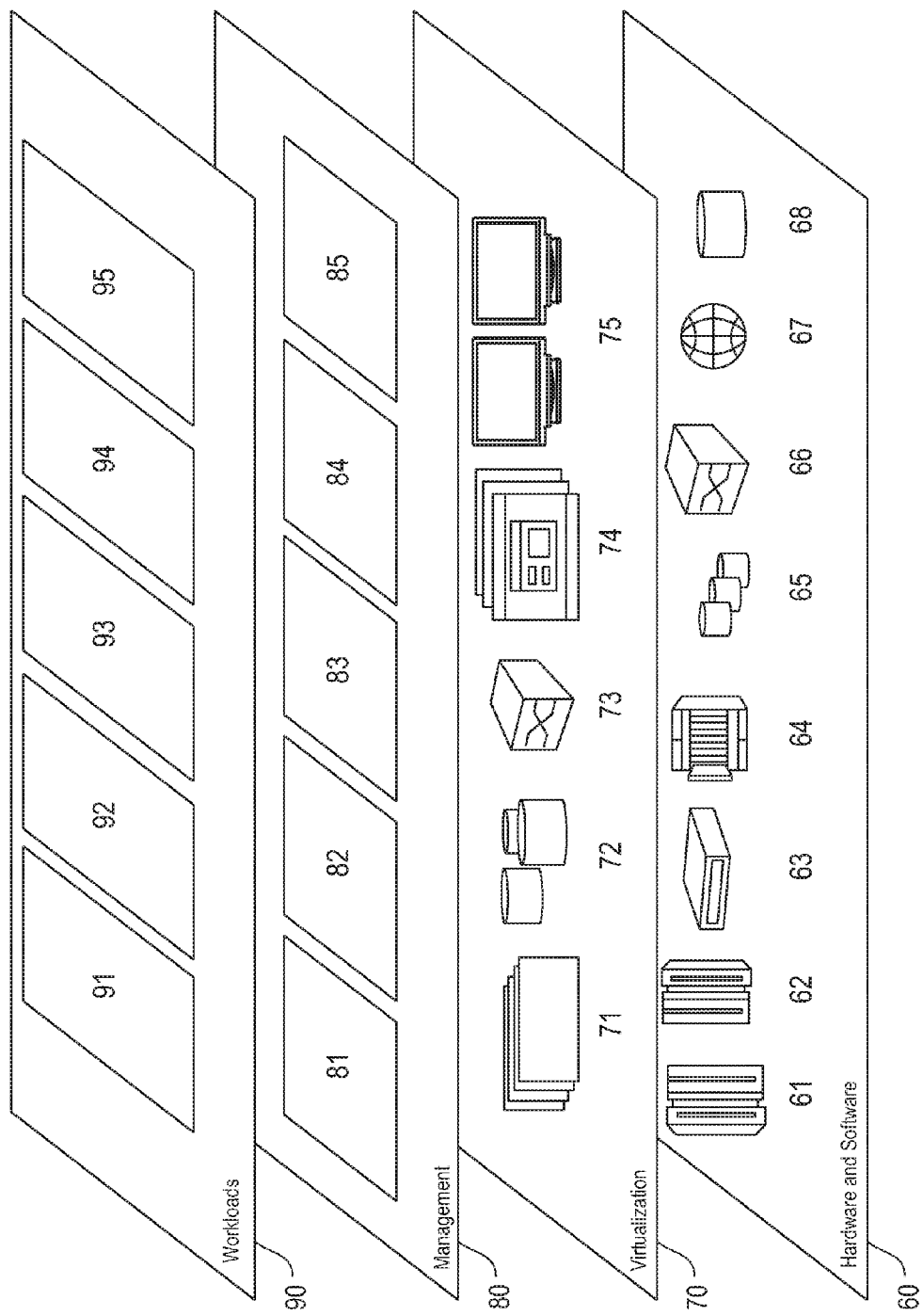
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
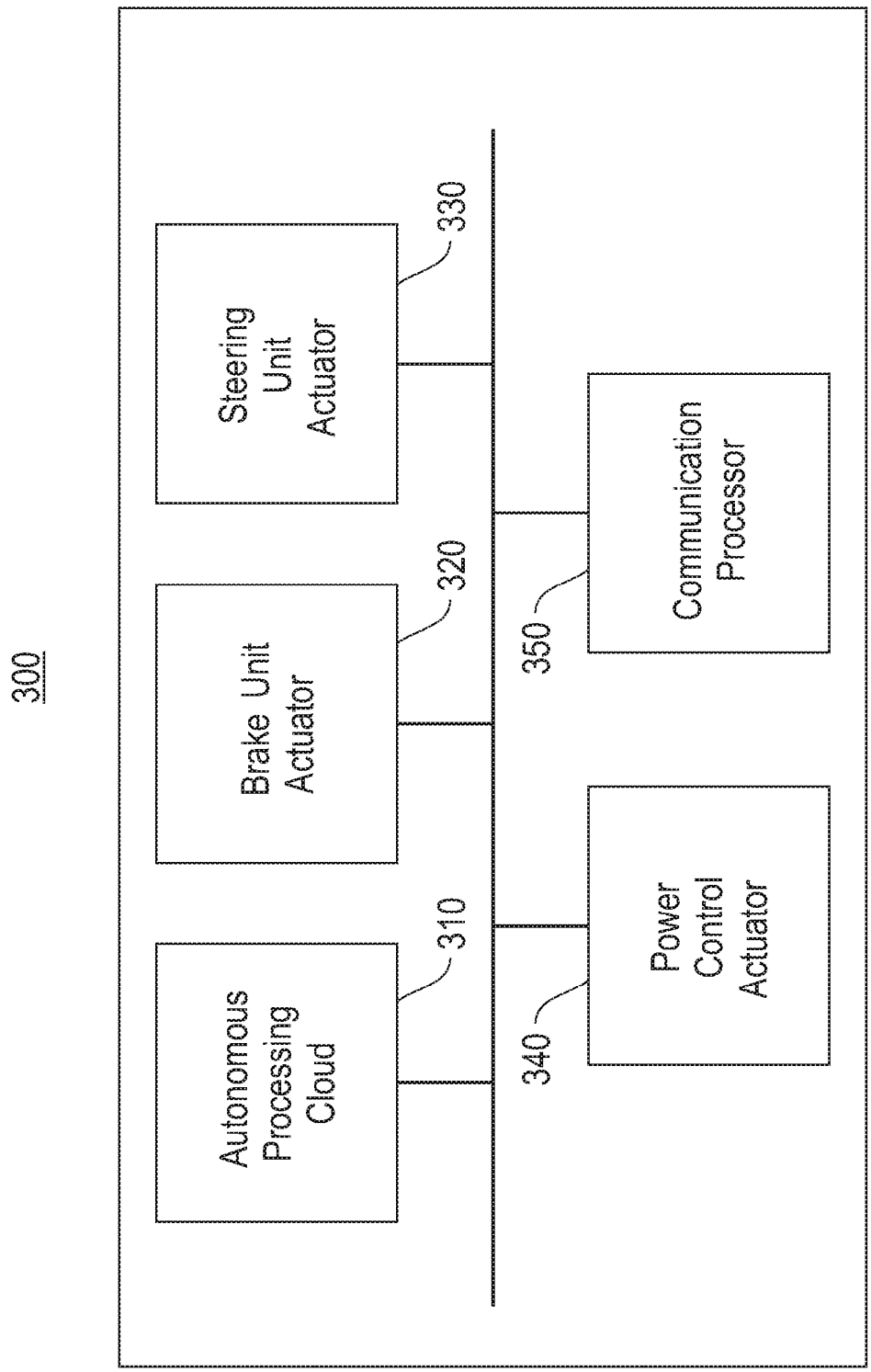
FIG. 3 is a block diagram illustrating a processing system for processing of scalable sensor fusion and autonomous x-by-wire control, according to an embodiment of the present invention.
Figure 4:
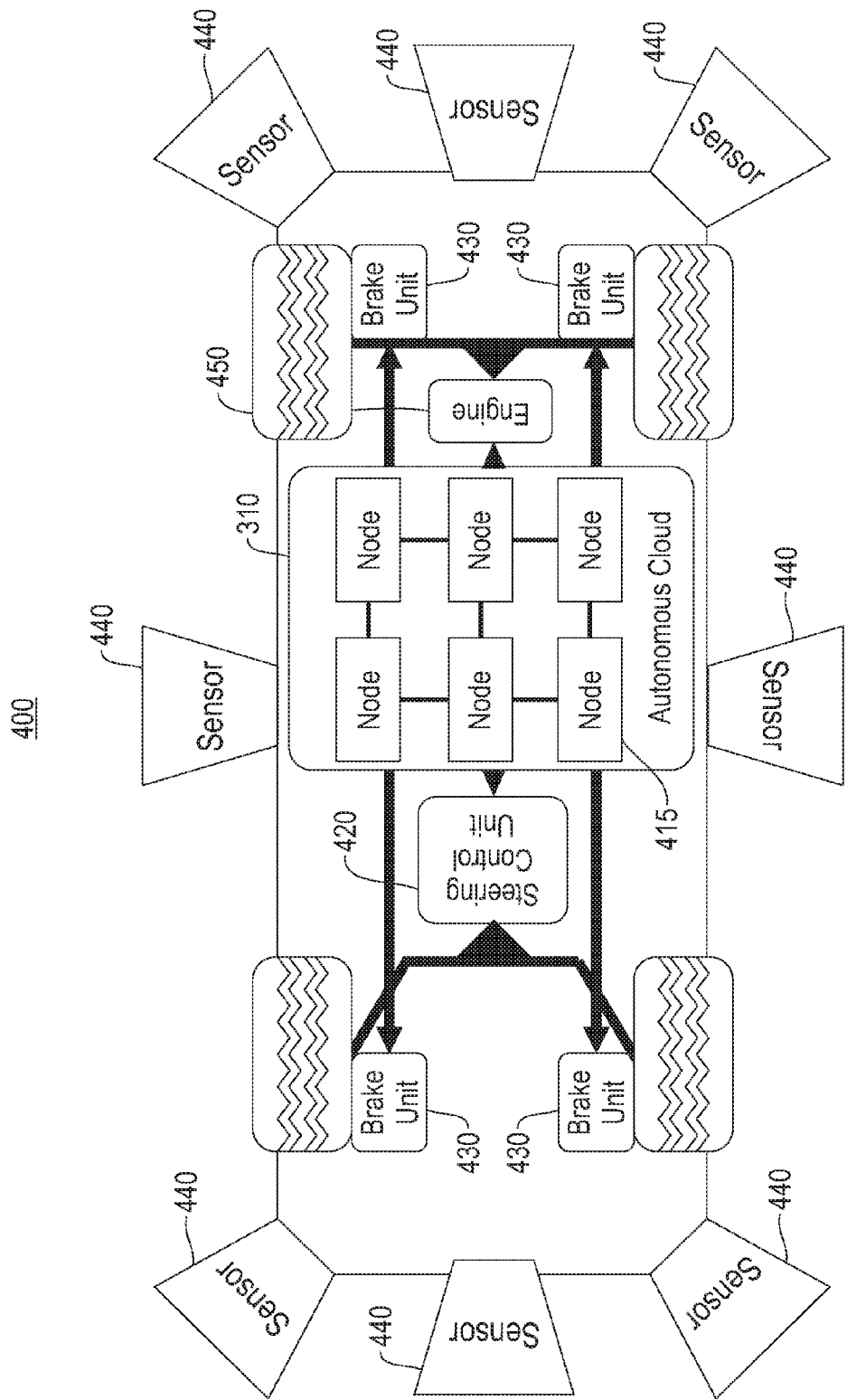
FIG. 4 shows an example vehicle incorporating an autonomous processing cloud for processing of scalable sensor fusion and autonomous x-by-wire control, according to an embodiment.

FIG. 3 illustrates a processing system 300 for scalable sensor fusion and autonomous x-by-wire control (e.g., for vehicles, robotics, smart homes performing surveillance tasks, threat tracking for sense and avoid, etc.), in accordance with one embodiment. In one embodiment, the processing system 300 includes an autonomous processing cloud 310, a brake unit actuator 320, a steering unit actuator 330, a power control actuator 340 and an optional communication processor 350. In one embodiment, the autonomous processing cloud 310 includes a system of distributed processing nodes 415 (see FIG. 4 and FIG. 5) that communicate with each other and with the brake unit actuator 320, the steering unit actuator 330, the power control actuator 340, the communication processor 350 as well as a multitude of heterogeneous sensors 440 (FIG. 4). In one embodiment, the optional communication processor 350 communicates externally to the processing system 300 for obtaining information from a cloud environment, such as cloud computing environment 50 (FIG. 1). In one example, the optional communication processor 350 may obtain information from the cloud environment that includes climate information, traffic information, flight or transportation status, calendar event information, waiting time information at venues, etc. In another example, the optional communication processor 350 may be employed for communicating between multiple autonomous vehicles that may be traveling together, as a group, as a fleet, etc. In one example, one autonomous vehicle may relay information regarding road conditions, an accident, vehicle problems, etc., to one or more other autonomous vehicles. In another example, the optional communication processor 350 may form an ad-hoc network between multiple autonomous vehicles.

Figure 5:
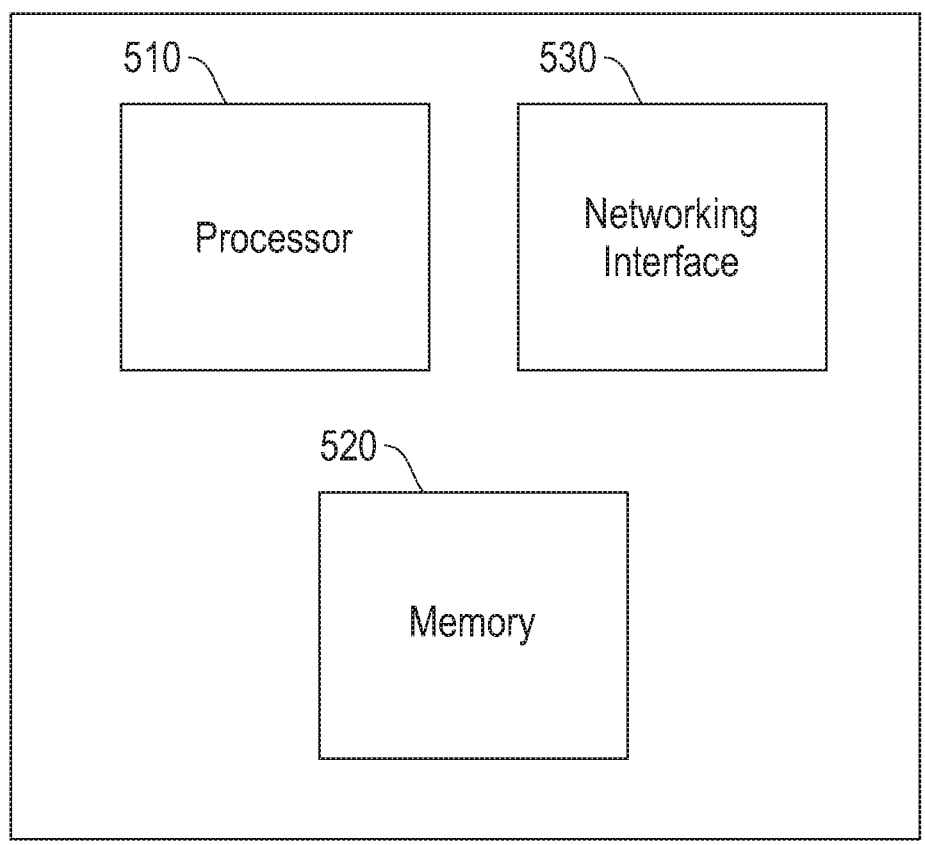
FIG. 5 is a block diagram illustrating a processing node of an autonomous cloud environment, according to an embodiment.

In one embodiment, the autonomous processing cloud 310 performs computations for sensor fusion. In one embodiment, Kalman filtering is used for sensor fusion. Estimations for sensor numerical values and actual numerical values obtained through sensor measurements are stored in matrices. The size of the matrices and thus, the computation complexity—are proportionate to the number of sensors. In one embodiment, the Kalman filtering implementation performs matrix multiplications (see example 700, FIG. 7) iteratively to determine the current estimate, which is then used to drive the actuators (e.g., brake unit 430, steering control unit 420, engine/power source 450 (FIG. 4), and any other actuators connected to the processing system 300 and controlled by the autonomous processing cloud 310 through actuator processors (e.g., the brake unit actuator 320, the steering unit actuator 330, and the power control actuator 340). The autonomous processing cloud 310 implements a distributed algorithm for matrix multiplications where the large matrices are broken up to columns and rows, and the multiplication/addition operations are distributed to a number of processing nodes 415 (FIGS. 4-5). This stage of operation is referred to as the MAP operator operation. In the second stage of operation, partial results are received from the processing nodes 415, and the partial results are merged to receive the final complete matrices, expressing the result of the multiplication. This second stage of operation is referred to as the REDUCE operator operation. In one embodiment, by applying a MAP and REDUCE operators for the implementation of the Kalman filtering, the processing system 300 is capable of scaling up computation power horizontally—by adding more processing nodes 415 to the autonomous processing cloud 310. One or more embodiments are also able to handle redundancy and provide fault-tolerant operation. While MAP and REDUCE operators have been successfully applied in the web context for batch processing of large amounts of data, i.e. web page indexing for the purpose of web search—the processing system 310 improves on the conventional approach by guaranteeing real-time performance for the task of iterative matrix multiplications—providing a solid platform for sensor fusion, and the real-time x-by-wire control of, for example, autonomous vehicles.

FIG. 4 shows an example vehicle 400 incorporating the autonomous processing cloud 310 for scalable sensor fusion and autonomous x-by-wire control, according to an embodiment. In one embodiment, the vehicle 400 is equipped with a number of sensors 440, which may include black and white, color, or infra-red cameras, Light Detection and Ranging (LIDAR) sensors, GPS, etc. The vehicle 400 includes a number of actuators, such as electronic gas pedal or power control (e.g., for controlling engine 450), a Steering Control Unit (SCU) 420, and four Brake Units (BUs) 430. All of the sensors 440 are connected to a set of connected computation nodes 415 of the autonomous processing cloud 310.

FIG. 5 is a block diagram illustrating a node 415 of the autonomous processing cloud 310, according to an embodiment. As described above, the processing node 415 includes one or more processors 510, a networking interface 530 and a memory 520. In one embodiment, each processor 510 performs processing using the sensor data received from sensors 440 (FIG. 4), and generates control values to directly drive any of the actuators to control the control units that include a power control unit, SCU 420 and BUs 430. The networking interface 530 provides communication with the processing nodes 415 of the autonomous processing cloud 310, the sensors 440, and the actuators. In one embodiment, the memory 520 stores and buffers data from the sensors 440 and processing results (e.g., intermediate results, final results, etc.), etc.

Returning to FIG. 4, in one embodiment, the processing nodes 415 partition and MAP processing tasks between the processing nodes 415, and merge and reduce results of individual processing tasks into an actionable table that specifies objectives for the autonomous processing cloud 310. Each of the nodes 415 reads signals from a set of sensors 440, interprets the signals as sets of sensor values over time, and performs sensor fusion processing over the sets of sensors 440 based on the sets of sensor values. In one example, sensor fusion processing includes weighting importance of the sets of sensor values received from the set of sensors 440 towards a pre-defined objective, and estimation determination based on Kalman filtering with sensor value matrice sizing that is proportional to a total number of sensors 440 in the vehicle 400.

In one embodiment, each processing node 415 determines control values based on a result of the sensor fusion processing, communicates the control values using the networking interface 530 (FIG. 5) to the actuators within a bounded time period from a time when the signals are received from the set of sensors 440, measures a difference between an intended behavior and an actual behavior, and provides processing using the one or more processors 510 to minimize the difference. Based on the processing from the nodes 415, the vehicle 400 is provided with x-by-wire control.

In one embodiment, the results of the individual processing tasks stored in the actionable table are determined in real-time within a bounded amount of time from a time when the sensor signals are read. In one example, the processing nodes 415 determine sensor failures and compensate for the sensor failure by decreasing the failed sensor importance weighting. In another example, the processing nodes 415 transfer a workload from one or more processing nodes 415 determined to have a fault to one or more active processing nodes 415. A reconfiguration of processing nodes 415 is achieved within a bounded time.

Figure 6:
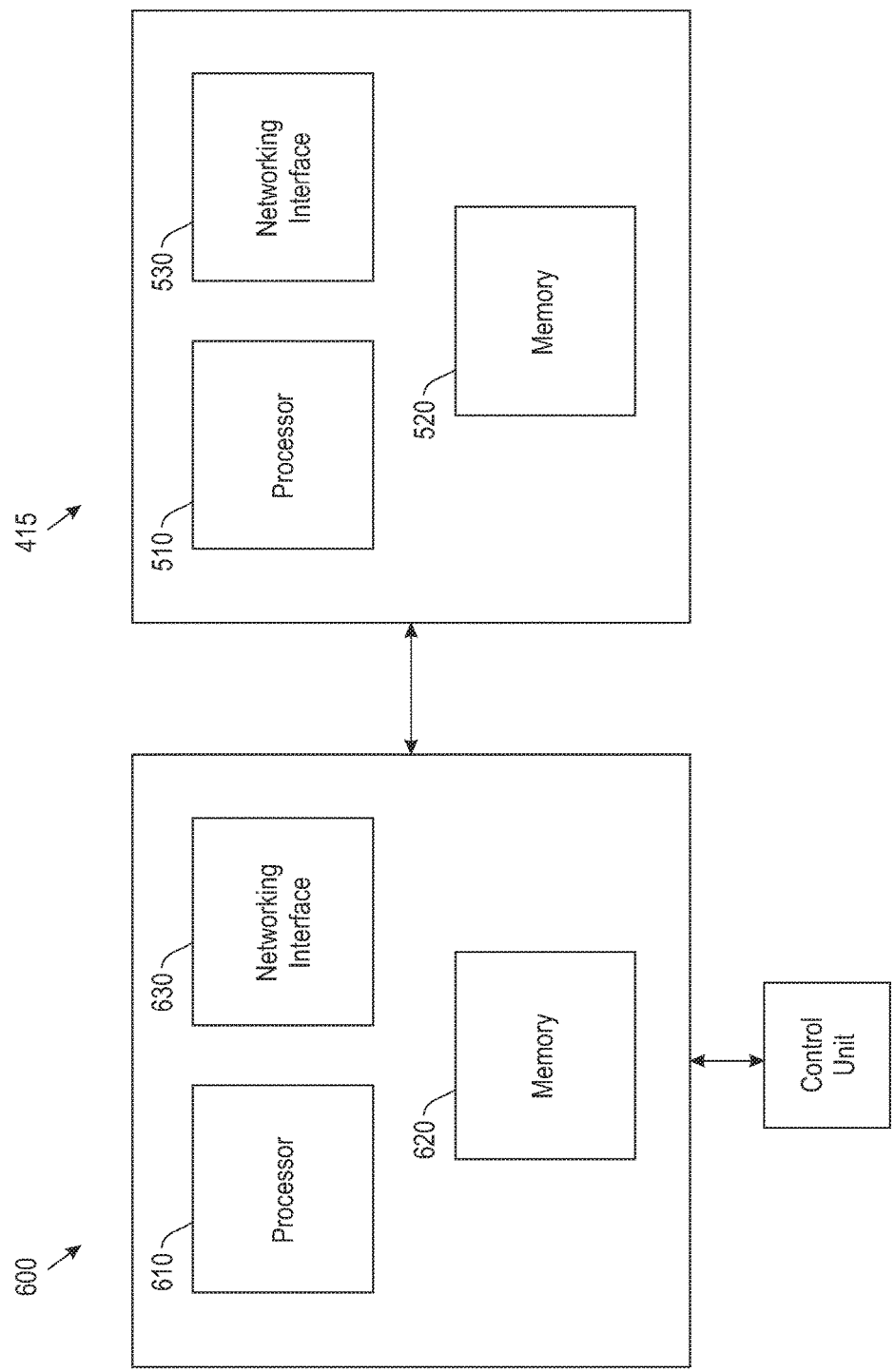
FIG. 6 is a block diagram illustrating the processing node of FIG. 5 in communication with another processing node connected to a control device, according to an embodiment.

FIG. 6 is a block diagram illustrating the processing node 415 in communication with another processing node 600 that is connected to a control device (e.g., an actuator), according to an embodiment. The processing nodes 415 and 600 each transfer data (e.g., sensor data, control data, etc.) using the networking interfaces 530 and 630 that may use any of a number of communication protocols to communicate over wire or wirelessly. The processing node 600 includes a processor 610 (similar to processor 510) and a memory 620 (similar to memory 520). The two processing nodes 415 and 600 may each handle a portion of a processing task (i.e., split the task) or each handle separate tasks for controlling the control unit. In one example, the two processing nodes 415 and 600 may each receive feedback information from the control unit and share that information between one another or with any other processing node 415 in the autonomous processing cloud 310.

Figure 7:
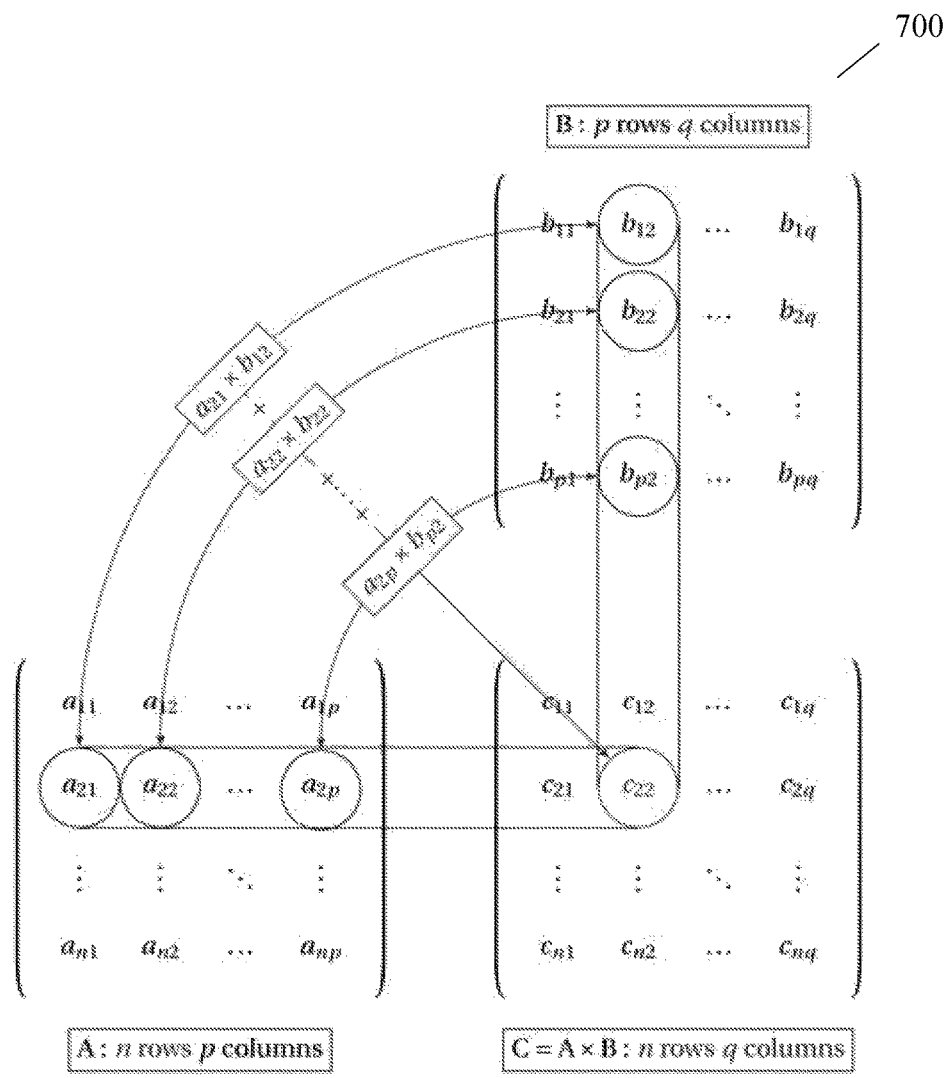
FIG. 7 shows an example of matrix multiplication used by an embodiment.

FIG. 7 shows an algorithm for matrix multiplication that may be employed by an embodiment for processing data in the autonomous processing cloud 310 (FIGS. 3-4) by the processing nodes 415. In one example, matrix multiplication is used by the processing nodes 415 to process sensor data in the autonomous processing cloud 310. In one example, matrix A has n rows and p columns, and matrix B has p rows and q columns. The result of matrix multiplication of A×B is matrix C, which has n rows and q columns. Each element $c_{i,j}$ in matrix A can be calculated as:

$$c_{i,j} = \Sigma_{k=1}^{p} = a_{i,k} b_{k,j}$$

Equation 1 where the result of the multiplication, matrix C, has n rows and q columns, and i, j, k, n and q are positive integers.

Figure 8:
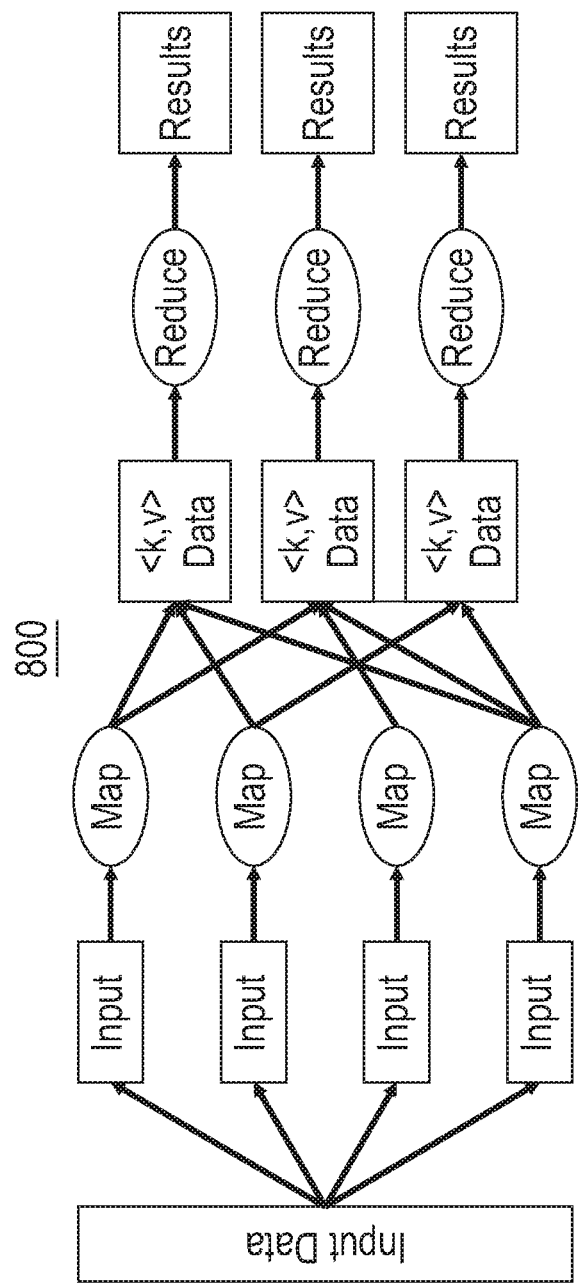
FIG. 8 is an example of a MAP and REDUCE operators cluster computation employed by an embodiment.

FIG. 8 is an example of a MAP and REDUCE operators cluster computation 800 employed by an embodiment for processing data in the autonomous processing cloud 310 (FIGS. 3-4) by the processing nodes 415. MAP and REDUCE operators were developed for batch processing of large amounts of data. In one embodiment, sensor data is split into smaller sub-tasks and assigned (mapped) to the different processing nodes 415. Stored data may be shuffled around so that each processing node 415 has access to the sensor data on which to perform processing/computations. The result of the processing/computations may be a set of key-value pairs. In a second stage of MAP and REDUCE operator processing, reducer processing nodes 415 receive the results of the sub-tasks, and merge them into the result of the overall task.

In one embodiment, employment of MAP and REDUCE operators processing by the processing nodes 415 (FIGS. 4-5) provides "scale-out" scalability; computation power can be increased by adding more processing nodes 415 to the autonomous processing cloud 310 (FIGS. 3-4) so that the size of sub-tasks can be kept manageable. In one example, the MAP and REDUCE operators may also be implemented in a hierarchical fashion, i.e., sub-tasks may be further divided into smaller sub-tasks. During the reduce phase, small sub-tasks may then be reduced to larger sub-tasks, before they are reduced to the result of the overall computation.

Traditional MAP and REDUCE operators target batch processing do not provide time bounds on how much time the overall computation will take. In one embodiment, the processing nodes 415 multiply arbitrarily large matrices within a bounded time in the autonomous processing cloud 310 using multiple processing nodes 415. This becomes an important enabler technology in autonomous applications, such as autonomous vehicles. As the number of sensors 440 (FIG. 4) on the vehicle (e.g., vehicle 400) grows, the size of matrices used for Kalman filtering grows, and so does the need for more computation power in order to keep the computation time bounded. Once the sensors 440 for the autonomous vehicle (e.g., vehicle 400) are decided, a Kalman filter model may be developed for the vehicle. The size of matrices is fixed, therefore computation needs can be identified.

Equation 1 specifies that for each element of the matrix multiplication result, p number of multiplications must be performed, and an equal amount of additions. Since the resulting matrix has n rows and q columns, this results in n×q×2p mathematical operations. Each element of the matrix can be processed by a single processing node 415, for deployment of n×q processing nodes 415 in the autonomous processing cloud 310. Merging the results of the sub-tasks is then accomplished by arranging all the resulting elements in a matrix format, such as a 2-dimensional array.

In one embodiment, as the size of matrices grow, performing $2p$ operations within a given time period may become challenging. In one embodiment, instead of having a single processing node 415 perform all the necessary computations, it is possible to break up the processing of individual elements as well within the matrix. In one example, Equation 1 can be broken up to two nodes as shown below in Equation 2:

$$c_{i,j} = \left(\sum_{k=1}^{\frac{p}{2}} a_{i,k} b_{k,j}\right) + \left(\sum_{k=\frac{p}{2}+1}^{p} a_{i,k} b_{k,j}\right).$$ Equation 2

The first processing node 415 can compute the value in the first parenthesis, while the second processing node 415 computes the value in the second parenthesis. By adding the results of these subtasks together, the processing nodes 415 may compute the $c_{i,j}$ value.

The final remaining issue is how to map matrix multiplication into key-value pairs. In one embodiment, one way to obtain keys for $c_{i,j}$ values is by including i and j in the key. If individual elements in the matrix are further broken up, the key should also store the beginning and ending value of k. All these values together uniquely identify what portion of the matrix multiplication the sub-results represent. During the reduce phase, $c_{i,j}$ values are obtained by adding sub-results together. Once all $c_{i,j}$ values are computed, they are arranged into a matrix representation, such as a two-dimensional array, concluding the computation processing. Since the number of elements multiplied and added together remains constant as new matrix values are computed, the time necessary for the computation can be similarly bounded.

Figure 9:
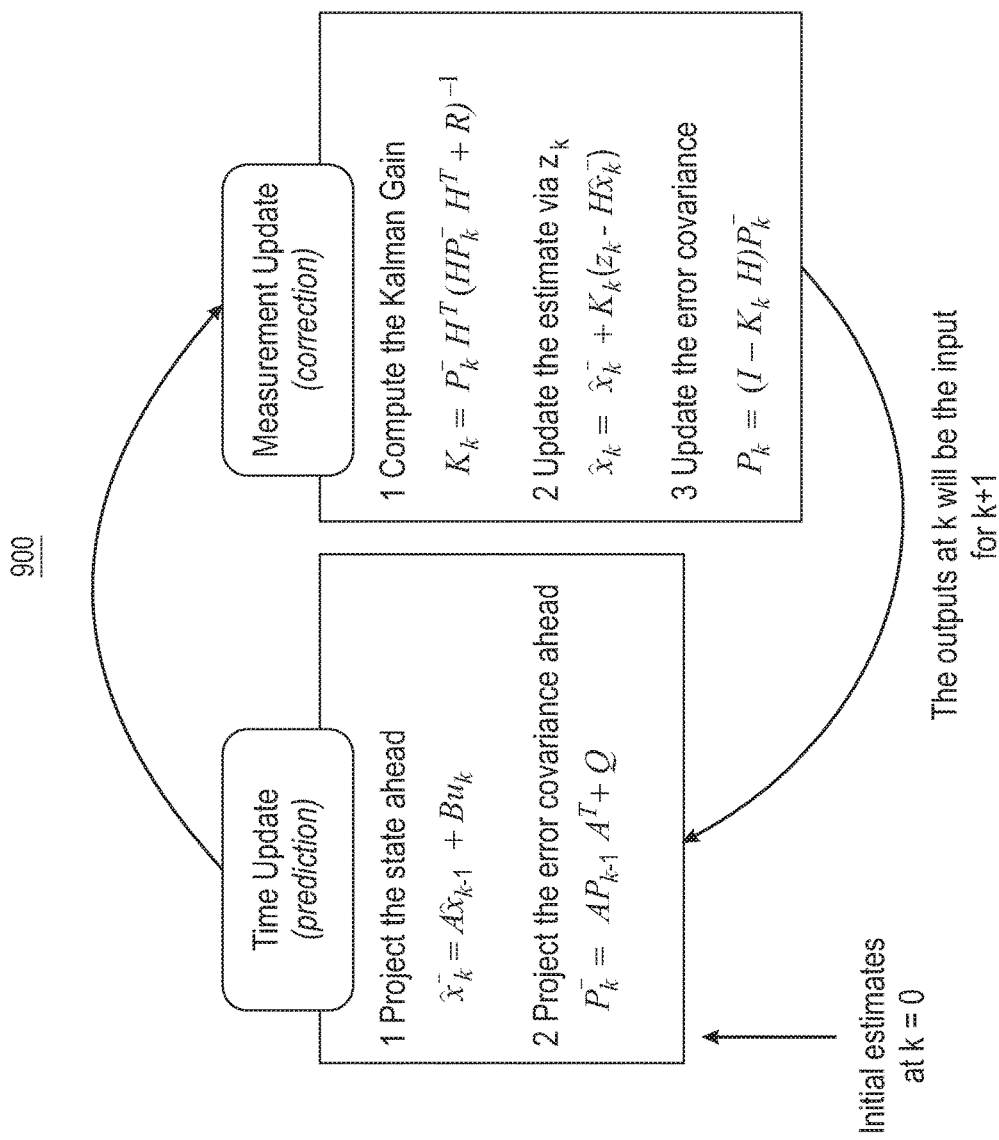
FIG. 9 is an example Kalman filter estimation process that may be employed by an embodiment.

FIG. 9 is an example 900 of a Kalman filter estimation process that may be employed by an embodiment. Example 900 shows the two major steps of a Kalman filtering. Operators applied include matrix multiplication, matrix inverse operation, matrix transpose operation, addition and subtraction. As described above, the matrix multiplication may be mapped to a real-time cluster computation based on MAP and REDUCE operators. In one embodiment, the other operators may also be performed in a distributed manner using the processing nodes 415 of the autonomous processing cloud 310. The two equations of a Kalman filter are as follows:

$$x_k = Ax_{k-1} + Bu_k + w_{k-1}$$ Equation 3.

$$z_k = Hx_k + v_k.$$ Equation 4.

This means that each $x_k$ (the signal values) may be evaluated by using a linear stochastic equation (Equation 3). Any $x_k$ is a linear combination of its previous value plus a control signal $u_k$ and a process noise. The second equation informs that any measurement value is a linear combination of the signal value and the measurement noise, which are both considered to be Gaussian. The process noise and measurement noise are statistically independent.

The entities A, B and H are in general form matrices. In one example, models are used such that these entities are just numeric values. Also as an additional computational ease, while these values may change between states, most of the time, processing assumes that they are constant. In one example, if the designer determines that processing fits into this model, the remaining processing is to estimate the mean and standard deviation of the noise functions $W_{k-1}$ and $v_k$. In reality, no signal is pure Gaussian, but it can be assumed using approximation. This is readily handled as the Kalman filtering processing attempts to converge into correct estimations, even if the Gaussian noise parameters are poorly estimated.

Once the model is fit into a Kalman filter, the next stage is to determine the necessary parameters and initial values. In one example, there are two distinct sets of equations: Time Update (prediction) and Measurement Update (correction). Both equation sets are applied at each $k^{th}$ state. The modeling is processed in Equation 3, therefore the matrices A, B and H are known. Matrices A, B and H could also be represented as numerical constants in some simple cases (e.g., equal to 1). Determining R and Q is next. R is readily determinable, because, in general, the noise in the environment can be measured during test driving and estimated. Determining Q is not as obvious. In one example, to start the process, the processing nodes 415 need to determine the estimate of $x_0$, and $P_0$.

In one example, after the processing nodes 415 obtain all the information required and started the Kalman filtering process, the processing nodes 415 can iterate through the estimates. Note that the previous estimates will be the input for the current state. Here, $\hat{x}^-_k$ is the "prior estimate" which in a way, means the rough estimate before the measurement update correction. And $P_k$ is the "prior error covariance." These "prior" values are used in the Measurement Update equations. In Measurement Update equations, the processing nodes 415 determine $\hat{x}_k$ which is the estimate of x at time k. Also, $P_k$ is determined which is necessary for the $k_1$ (future) estimate, together with $\hat{x}_k$. The Kalman Gain ($K_k$) evaluated is not needed for the next iteration step. The values evaluated at the Measurement Update stage are also referred to as "posterior" values.

In one embodiment, the distributed process for matrix multiplication and transpose are enabling technologies to implement Kalman filtering using the autonomous processing cloud 310 (FIGS. 3-4). The two equations that define the Kalman filter can be distributed over the autonomous processing cloud 310, providing the computation capability to repeatedly perform measurement updates even on large matrices (representing a large number of sensors).

To calculate the inverse of a matrix in the general sense, a number of equations must be solved. One way to do that is by Gauss-elimination, which can be solved in a distributed manner similar to matrix multiplication. There are also variants of Kalman filters that reduce the computational complexity required to compute matrix inverse operations (i.e. Fast Kalman filter, unscented Kalman filters using Cholesky decompositions). The matrix transpose operator changes matrix rows with matrix columns. In one example, this is implemented by re-ordering the keys in the MAP and REDUCE operators key-value pairs. In one example, matrix addition/subtraction is distributed in the same manner as matrix multiplication.

Figure 10:
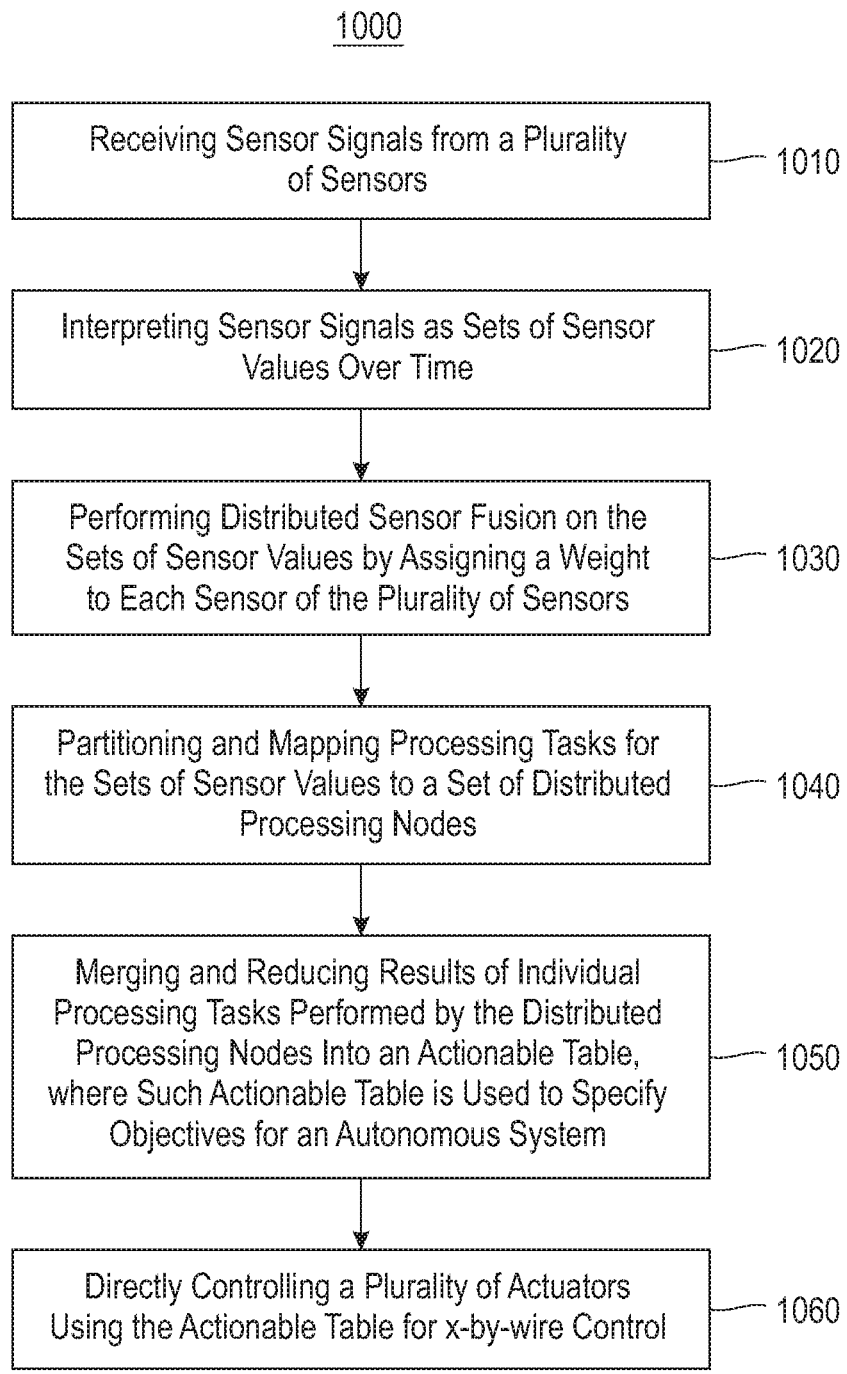
FIG. 10 illustrates a block diagram for a process for scalable sensor fusion and autonomous x-by-wire control, according to one embodiment.

FIG. 10 illustrates a block diagram for a process 1000 for scalable sensor fusion and autonomous x-by-wire control, according to one embodiment. In one embodiment, in block 1010 sensor signals are received from multiple heterogeneous sensors (e.g., sensors 440, FIG. 4). In block 1020 sensor signals are interpreted as sets of sensor values over time.

In block 1030 distributed sensor fusion is performed (e.g., using processing nodes 415 of the autonomous processing cloud 310, FIGS. 3-4) on the sets of sensor values by assigning a weight to each sensor of the multiple sensors. In one example, a fly-by-wire fighter jet with unstable flight envelope. Such fighter jets are designed to be unstable in order to allow very rapid turns and maneuvering capability. Such planes cannot be flown without the help of a computerized fly-by-wire system. All the controls managed by the pilot, i.e. flight grip (stick), rudders, throttles are captured in the input signal $x_{k-1}$ of Equation 3. These express the pilot's "intent" for flying the plane. The state of the aircraft, such as yaw, roll, and pitch, speed along 3-dimensional axes, etc. can also be captured as part of $x_{k-1}$. The fly-by-wire system performs rapid calculations and in turn performs rapid movements on the control surfaces, in order to keep the plane flying stable. Such feedback control signals are captured as the vector $u_k$ in Equation 3. These signals are hidden from the pilot, and may be calculated within a fraction of a second. The control surfaces are in motion, even as the pilot input remains constant. Based on these signals and the weights captured in the matrices A, B, and H (as described above), the Kalman filter estimates the next value of $x_k$, in essence performing a prediction. This provides the mechanism through which the auto-pilot is capable of "staying ahead" of the vehicle, and driving it autonomously. Measurement updates are used to minimize differences between the predicted values and the actual conditions measured.

In block 1040, processing tasks are partitioned and mapped for the sets of sensor values to a set of distributed processing nodes. In one example, block 1040 may represent the distributed matrix multiplication algorithm described above and implements the Kalman filtering on the autonomous processing cloud (e.g., autonomous processing cloud 310, FIGS. 3-4).

In block 1050 the results of individual processing tasks performed by the distributed processing nodes are merged and reduced into an actionable table, where the actionable table is used to specify objectives for an autonomous system (e.g., autonomous vehicle 400). In one example, block 1050 includes the REDUCE operation, constructing the updated matrices from key-value sub-results. In block 1060 multiple actuators are directly controlled using the actionable table for x-by-wire control.

In one embodiment, process 1000 may further include storing, by each of the distributed processing nodes, sensor data received from one or more sensors, processing, by each of the distributed processing nodes, the sets of sensor values, generating, by each of the distributed processing nodes, control values to directly drive any of the actuators, and communicating, by each of the distributed processing nodes, between the processing nodes, with the sensors, and with the of actuators (e.g., via networking interfaces 530 of the processing nodes 415).

In one embodiment, process 1000 may further include reading, by each of the distributed processing nodes, signals from a set of sensors, interpreting, by each of the distributed processing nodes, the signals as sets of sensor values over time, and performing, by each of the distributed processing nodes, sensor fusion processing over the sets of sensors based on the sets of sensor values. In one example, sensor fusion processing includes weighting importance of the sets of sensor values received from the set of sensors towards a pre-defined objective, and determining estimations based on Kalman filtering with sensor value matrices sizing that is proportional to a total number of sensors in the plurality of sensors.

In one embodiment, process 1000 may additionally include determining, by each of the distributed processing nodes, control values based on a result of the sensor fusion processing, communicating, by each of the distributed processing nodes, the control values to the actuators within a bounded time period from a time when the signals are received from the set of sensors, measuring, by each of the distributed processing nodes, a difference between an intended behavior and an actual behavior, processing, by each of the distributed processing nodes, to minimize the difference, and providing x-by-wire control for a vehicle (e.g., a car, a truck, a boat, etc.). In other embodiments, the process 1000 may provide x-by-wire control for other applications, such as robotics, home systems (e.g., security systems), etc.

In one embodiment, process 1000 may provide that the results of the individual processing tasks stored in the actionable table are determined in real-time within a bounded amount of time from a time when the sensor signals are read. In one embodiment, process 1000 may further include determining, by each of the distributed processing nodes, sensor failure, compensating, by each of the distributed processing nodes, for the sensor failure by decreasing the failed sensor importance weighting, and transferring, by each of the distributed processing nodes, a workload from one or more processing nodes determined to have a fault to one or more active processing nodes. In one example, a reconfiguration of processing nodes is achieved within a bounded tune.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An autonomous system comprising:
a plurality of processing nodes distributed and coupled to one another;
a plurality of sensors coupled to the processing nodes; and
a plurality of actuators including at least one power control actuator, at least one brake actuator, and at least one steering actuator, the plurality of actuators configured to directly control the autonomous system driven by and coupled to the plurality of processing nodes for throttle-by-wire, brake-by-wire and steer-by-wire control;
wherein each processing node of the plurality of processing nodes is configured to:
partition and map processing tasks between the plurality of processing nodes;
merge and reduce results of individual processing tasks into an actionable table that specifies objectives comprising control values resulting from sensor fusion processing, the objectives are used to directly control the plurality of actuators for the autonomous system; and
transfer a workload from one or more processing nodes determined to have a fault to one or more active processing nodes, wherein a reconfiguration of processing nodes is achieved within a bounded time.

2. The autonomous system of claim 1, wherein each of the processing nodes comprise:
at least one memory device configured to store sensor data received from one or more of the plurality of sensors;
at least one processor configured to perform processing using the sensor data received from sensors, and generate the control values to directly drive any of the plurality of actuators; and
a networking interface configured to provide communication with the plurality of processing nodes, the plurality of sensors, and the plurality of actuators.

3. The autonomous system of claim 2, wherein each processing node of the plurality of processing nodes is further configured to:
read signals from a set of sensors of the plurality of sensors;
interpret the signals as sets of sensor values over time; and
perform the sensor fusion processing over the set of sensors based on the sets of sensor values,
wherein each processing node of the plurality of processing nodes uses map-reduce operations for the sensor fusion processing to process the sensor data to provide the control values from the actionable table to the plurality of actuators.

4. The autonomous system of claim 3, wherein sensor fusion processing comprises weighting importance of the sets of sensor values received from the set of sensors towards a pre-defined objective, and estimation determination based on Kalman filtering with sensor value matrice sizing that is proportional to a total number of sensors in the plurality of sensors.

5. The autonomous system of claim 4, wherein each processing node of the plurality of processing nodes is configured to:
determine control values based on a result of the sensor fusion processing;
communicate the control values to the plurality of actuators within a bounded time period from a time when the signals are received from the set of sensors;
measure a difference between an intended behavior for the plurality of actuators based on the control values communicated and an actual behavior output from the plurality of actuators based on the control values; and
provide processing to minimize the difference,
wherein throttle-by-wire, brake-by-wire and steer-by-wire control is provided for a vehicle.

6. The autonomous system of claim 4, wherein:
the results of the individual processing tasks stored in the actionable table are determined in real-time within a bounded amount of time from a time when the sensor signals are read;
the plurality of sensors comprises one or more: camera devices, light detection and ranging (LIDAR) sensors, and a global positioning sensor (GPS); and
the plurality of actuators comprises one or more: an electronic power control, a steering control unit (SCU), and braking units (BUs).

7. The autonomous system of claim 1, wherein each processing node of the plurality of processing nodes is further configured to:
determine sensor failure and compensate for the sensor failure by decreasing failed sensor importance weighting.

8. A method for sensor fusion and autonomous control comprising:
receiving sensor signals from a plurality of sensors;
interpreting sensor signals as sets of sensor values over time;
performing distributed sensor fusion on the sets of sensor values by assigning a weight to each sensor of the plurality of sensors;
partitioning and mapping processing tasks for the sets of sensor values to a set of distributed processing nodes;
merging and reducing results of individual processing tasks performed by the distributed processing nodes into an actionable table, where such actionable table is used to specify objectives comprising control values resulting from sensor fusion processing, the objectives are used for an autonomous system;
directly controlling a plurality of actuators using the actionable table for throttle-by-wire, brake-by-wire and steer-by-wire control, wherein the plurality of actuators includes at least one power control actuator, at least one brake actuator and at least one steering actuator; and
transferring, by each of the distributed processing nodes, a workload from one or more processing nodes determined to have a fault to one or more active processing nodes wherein a reconfiguration of processing nodes is achieved within a bounded time.

9. The method of claim 8, further comprising:
storing, by each of the distributed processing nodes, sensor data received from at least one sensor of the plurality of sensors;
processing, by each of the distributed processing nodes, the sets of sensor values;
generating, by each of the distributed processing nodes, the control values to directly drive any of the plurality of actuators; and communicating, by each of the distributed processing nodes, between the plurality of processing nodes, with the plurality of sensors, and with the plurality of actuators.

10. The method of claim 9, further comprising:
reading, by each of the distributed processing nodes, signals from a set of sensors of the plurality of sensors;
interpreting, by each of the distributed processing nodes, the signals as sets of sensor values over time; and
performing, by each of the distributed processing nodes, sensor fusion processing over the set of sensors based on the sets of sensor values,
wherein each processing node of the distributed processing nodes uses map-reduce operations for the distributed sensor fusion processing to process the sensor data to provide the control values from the actionable table to the plurality of actuators.

11. The method of claim 10, wherein sensor fusion processing comprises weighting importance of the sets of sensor values received from the set of sensors towards a pre-defined objective, and determining estimations based on Kalman filtering with sensor value matrice sizing that is proportional to a total number of sensors in the plurality of sensors.

12. The method of claim 11, further comprising:
determining, by each of the distributed processing nodes, control values based on a result of the sensor fusion processing;
communicating, by each of the distributed processing nodes, the control values to the plurality of actuators within a bounded time period from a time when the signals are received from the set of sensors;
measuring, by each of the distributed processing nodes, a difference between an intended behavior for the plurality of actuators based on the control values communicated and an actual behavior output from the plurality of actuators based on the control values;
processing, by each of the distributed processing nodes, to minimize the difference; and
providing throttle-by-wire, brake-by-wire and steer-by-wire control for a vehicle.

13. The method of claim 11, wherein:
the results of the individual processing tasks stored in the actionable table are determined in real-time within a bounded amount of time from a time when the sensor signals are read;
the plurality of sensors comprises one or more: camera devices, light detection and ranging (LIDAR) sensors, and a global positioning sensor (GPS); and
the plurality of actuators comprises one or more: an electronic power control, a steering control unit (SCU), and braking units (BUs).

14. The method of claim 8, further comprising:
determining, by each of the distributed processing nodes, sensor failure; and
compensating, by each of the distributed processing nodes, for the sensor failure by decreasing failed sensor importance weighting.

15. An autonomous computing environment for x-by-wire control of a vehicle comprising:
an actionable table that specifies objectives comprising control values resulting from sensor fusion processing, the objectives are used to directly control a plurality of actuators for the computing environment, the plurality of actuators including at least one power control actuator, at least one brake actuator and at least one steering actuator; and a plurality of processing nodes distributed and coupled to one another, each of the processing nodes are configured to receive sensor data from a plurality of sensors and to control the plurality of actuators to directly control vehicle devices for throttle-by-wire, brake-by-wire and steer-by-wire control;
wherein each processing node of the plurality of processing nodes is configured to:
partition and map processing tasks for distribution between the plurality of processing nodes;
merge and reduce results of individual processing tasks into the actionable table; and
transfer a workload from one or more processing nodes determined to have a fault to one or more active processing nodes, wherein a reconfiguration of processing nodes is achieved within a bounded time.

16. The autonomous computing environment of claim 15, wherein each of the processing nodes comprise:
at least one memory device configured to store sensor data received from one or more of the plurality of sensors;
at least one processor configured to perform processing using the sensor data received from sensors, and generate control values to directly drive any of the plurality of actuators; and
a networking interface configured to provide communication with the plurality of processing nodes, the plurality of sensors, and the plurality of actuators.

17. The autonomous computing environment system of claim 16, wherein each processing node of the plurality of processing nodes is further configured to:
read signals from a set of sensors of the plurality of sensors;
interpret the signals as sets of sensor values over time; and
perform sensor fusion processing over the set of sensors based on the sets of sensor values, wherein sensor fusion processing comprises weighting importance of the sets of sensor values received from the set of sensors towards a pre-defined objective, estimation determination based on Kalman filtering with sensor value matrice sizing that is proportional to a total number of sensors in the set of sensors, and each processing node of the plurality of processing nodes uses map-reduce operations for the sensor fusion processing to process the sensor data to provide the control values from the actionable table to the plurality of actuators.

18. The autonomous computing environment of claim 17, wherein each processing node of the plurality of processing nodes is configured to:
determine control values based on a result of the sensor fusion processing;
communicate the control values to the plurality of actuators within a bounded time period from a time when the signals are received from the set of sensors;
measure a difference between an intended behavior for the plurality of actuators based on the control values communicated and an actual behavior output from the plurality of actuators based on the control values; and
provide processing to minimize the difference.

19. The autonomous computing environment of claim 17, wherein:
the results of the individual processing tasks stored in the actionable table are determined in real-time within a bounded amount of time from a time when the sensor signals are read;

the plurality of sensors comprises one or more: camera devices, light detection and ranging (LIDAR) sensors, and a global positioning sensor (GPS); and the plurality of actuators comprises one or more: an electronic power control, a steering control unit (SCU), and braking units (BUs).

20. The autonomous computing environment of claim 15, wherein the plurality of processing nodes is further configured to:

determine sensor failure and compensate for the sensor failure by decreasing failed sensor importance weighting.

* * * * *